(12) United States Patent
Chen et al.

(10) Patent No.: US 9,341,762 B2
(45) Date of Patent: May 17, 2016

(54) BACKLIGHT MODULE

(71) Applicant: AU Optronics Corp., Hsin-Chu (TW)

(72) Inventors: Yu-Yu Chen, New Taipei (TW);
Chih-Liang Pan, Hsin-Chu (TW);
Yen-Po Yeh, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 178 days.

(21) Appl. No.: 14/334,673

(22) Filed: Jul. 18, 2014

(65) Prior Publication Data

US 2014/0321154 A1    Oct. 30, 2014

Related U.S. Application Data

(63) Continuation of application No. 13/226,453, filed on Sep. 6, 2011, now abandoned.

(30) Foreign Application Priority Data

Dec. 20, 2010   (TW) ................................ 99144689 A (51) Int. Cl.
*G02B 6/00*    (2006.01)
*F21V 8/00*    (2006.01)
(Continued)

(52) U.S. Cl.
CPC ............ *G02B 6/0031* (2013.01); *G02B 6/0083* (2013.01); *G02F 1/133605* (2013.01); *G02F 2001/133314* (2013.01)

(58) Field of Classification Search
CPC ................ G02B 6/0083; G02B 6/0031; G02F 1/133615

USPC .............................................. 362/6, 609–611
See application file for complete search history.

(56) References Cited

U.S. PATENT DOCUMENTS

| | | |
|---|---|---|
| 7,241,040 B2 | 7/2007 | Ahn |
| 7,488,104 B2 | 2/2009 | Hamada |
| 7,588,359 B2 | 9/2009 | Coushaine |

(Continued)

FOREIGN PATENT DOCUMENTS

| | | |
|---|---|---|
| CN | 1556433 A | 12/2004 |
| CN | 201416803 Y | 3/2010 |

(Continued)

OTHER PUBLICATIONS

Kumar, V., "Microcellular Polymers: Novel Materials for the 21st Century," Progress in Rubber and Plastics Technology, vol. 9, No. 1, 1993, pp. 54-70.

*Primary Examiner* — Sean Gramling
*Assistant Examiner* — Gerald J Sufleta, II
(74) *Attorney, Agent, or Firm* — Winston Hsu; Scott Margo (57) ABSTRACT

A reflective back cover made of plastic material having micro cellular structures is processed by compression molding and cutting so as to have a monolithical structure. The white material of the reflective back cover reflects lights such that the back cover can be an integral component featuring multiple functions of various components. With the thickness control of the reflective back cover, a concave can be formed at the side of the back cover where a light source is contained and the concave further retains the light source and its flexible printed circuit board. With the incorporation of the reflective back cover, the thickness of the backlight module can be reduced and a reliable and repetitive manufacturing of the backlight module can be introduced.

18 Claims, 14 Drawing Sheets

(51) Int. Cl.
*G02F 1/1335* (2006.01)
*G02F 1/1333* (2006.01)

(56) References Cited

U.S. PATENT DOCUMENTS

| | | |
|---|---|---|
| 7,782,421 B2 | 8/2010 | Bang |
| 2004/0141305 A1 | 7/2004 | Higashiyama |
| 2005/0140850 A1 | 6/2005 | Su |
| 2008/0089097 A1 | 4/2008 | Kim |
| 2009/0147183 A1 | 6/2009 | Byoun |
| 2009/0316417 A1 | 12/2009 | Chari |
| 2010/0135003 A1 | 6/2010 | Huang |
| 2010/0149835 A1 | 6/2010 | Cho |
| 2010/0165233 A1 | 7/2010 | Jung |
| 2010/0165241 A1 | 7/2010 | Kim |
| 2010/0188599 A1 | 7/2010 | Arihara |
| 2011/0002141 A1 | 1/2011 | Chang |
| 2011/0134366 A1 | 6/2011 | Pan |
| 2011/0141391 A1 | 6/2011 | Kim |

FOREIGN PATENT DOCUMENTS

| | | |
|---|---|---|
| JP | 2005078917 | 3/2005 |
| TW | M366097 | 10/2009 |
| TW | 201003228 | 1/2010 |
| TW | 201005383 | 2/2010 |

BACKLIGHT MODULE

CROSS REFERENCE TO RELATED APPLICATIONS

This application is a Continuation Application of U.S. non-provisional application Ser. No. 13/226,453, filed on Sep. 6, 2011, which is incorporated herein by reference.

BACKGROUND OF THE INVENTION

1. Field of the Invention

The invention relates to a backlight module, and more particularly, to a backlight module with an integral reflective back cover incorporating a reflector, a back cover, and a plastic frame.

2. Description of the Prior Art

Notebooks or netbooks have developed to be miniaturized as a fashion. To effectively reduce the thickness of these laptop computers, displays of the computers are further discussed also as a subject to reduce the thickness in addition to existing adaption of smaller components in the base of the laptop computers.

Generally, an LCD display, applied to laptop computers, for desktop computers, or home TV, includes at least a backlight module and a panel module. One type of backlight module, the laterally illuminated backlight module includes a light component, a light guide plate, a reflector, optical films, and a flexible printed circuit or circuit board that connects to the light component. A metal back cover and a plastic frame are further used to assemble all the components to form the backlight module. Another metal frame and the panel module are assembled further for completion of an LCD display. A common light component of a laterally illuminated backlight module includes a housing and a light emitting diode chip. The light component and its connected flexible printed circuit board are configured at a side of the metal back cover, wherein the flexible printed circuit board is configured between the light component and the metal back cover. The light guide plate of the backlight module sticks close to a side of the chip of the light component. The reflector is configured between the light guide plate and the metal back cover for reflecting the lights scattered by the light guide plate. From the discussion about the backlight module above, too many assembling frames substantially may limit the possibility of further reducing the thickness of the backlight module. Secondly, although the scattered lights may be reflected by the reflector, the backlight performance at the peripheral of the backlight module is always affected by the size of the reflector. Additionally, the plastic frame necessary for assembling and positioning the optical films and the panel module contributes to the number of components used in the LCD display, the complexity of assembling and overall thickness.

SUMMARY OF THE INVENTION

The invention provides a backlight module. The backlight module includes a light component, a light guide plate, and a reflective back cover. The light component is utilized for generating a light source. The light component is connected to a first circuit board and includes a light emitting surface. The light guide plate includes an incident surface for abutting against the light emitting surface of the light component along a first direction to receive the light source. The reflective back cover is utilized for reflecting the light source emitted from the light component and the light guide plate and includes a concave disposed on an assembling surface where the light component and the light guide plate are assembled. The first circuit board and the light component are configured at the concave along a second direction. The concave positions and retains the light component along the first direction.

The invention also provides a reflective back cover of a backlight module. The reflective back cover allows a light component and a light guide plate of the backlight module to assemble thereunto. The light guide plate abuts against the light component along a first direction for receiving a light source of the light component. The reflective back cover includes a concave disposed on an assembling surface where the light component and the light guide plate are assembled. The light component and a circuit board, which is connected to the light component, are configured at the concave along a second direction. The concave positions and retains the light component along the first direction.

The invention also provides a display device. The display device includes a backlight module, an optical film, a frame, and a panel module. The backlight module includes a light component, a light guide plate, and a reflective back cover. The light component generates a light source and is connected to a first circuit board and includes a light emitting surface. The light guide plate includes an incident surface for abutting against the light emitting surface of the light component along a first direction to receive the light source. The reflective back cover reflects the light source emitted from the light component and the light guide plate and includes a concave disposed on an assembling surface where the light component and the light guide plate are assembled. The first circuit board and the light component are configured at the concave along a second direction. The concave positions and retains the light component along the first direction. The optical film is assembled along the second direction to the light guide plate. The frame is configured at a side of the reflective back cover where the light component is assembled. The frame covers around the light component. The panel module is assembled on the reflective back cover.

The reflective back cover of the invention integrates a reflector, a plastic frame, and a metal cover as an integral component, reducing the number of component in the backlight module, cost of manufacture, and increasing the efficiency of assembling. A reliable and repetitive manufacturing of the backlight module can be introduced.

These and other objectives of the present invention will no doubt become obvious to those of ordinary skill in the art after reading the following detailed description of the preferred embodiment that is illustrated in the various figures and drawings.

These and other objectives of the present invention will no doubt become obvious to those of ordinary skill in the art after reading the following detailed description of the preferred embodiment that is illustrated in the various figures and drawings.

DETAILED DESCRIPTION

An improved integral component that incorporates a white reflector, a back metal cover, and a plastic frame to forma reflective back cover is designed into a backlight module of the invention. A concave for containing the light component is further implemented therein by processing with the thickness of a certain region of the reflective back cover.

Figure 1:
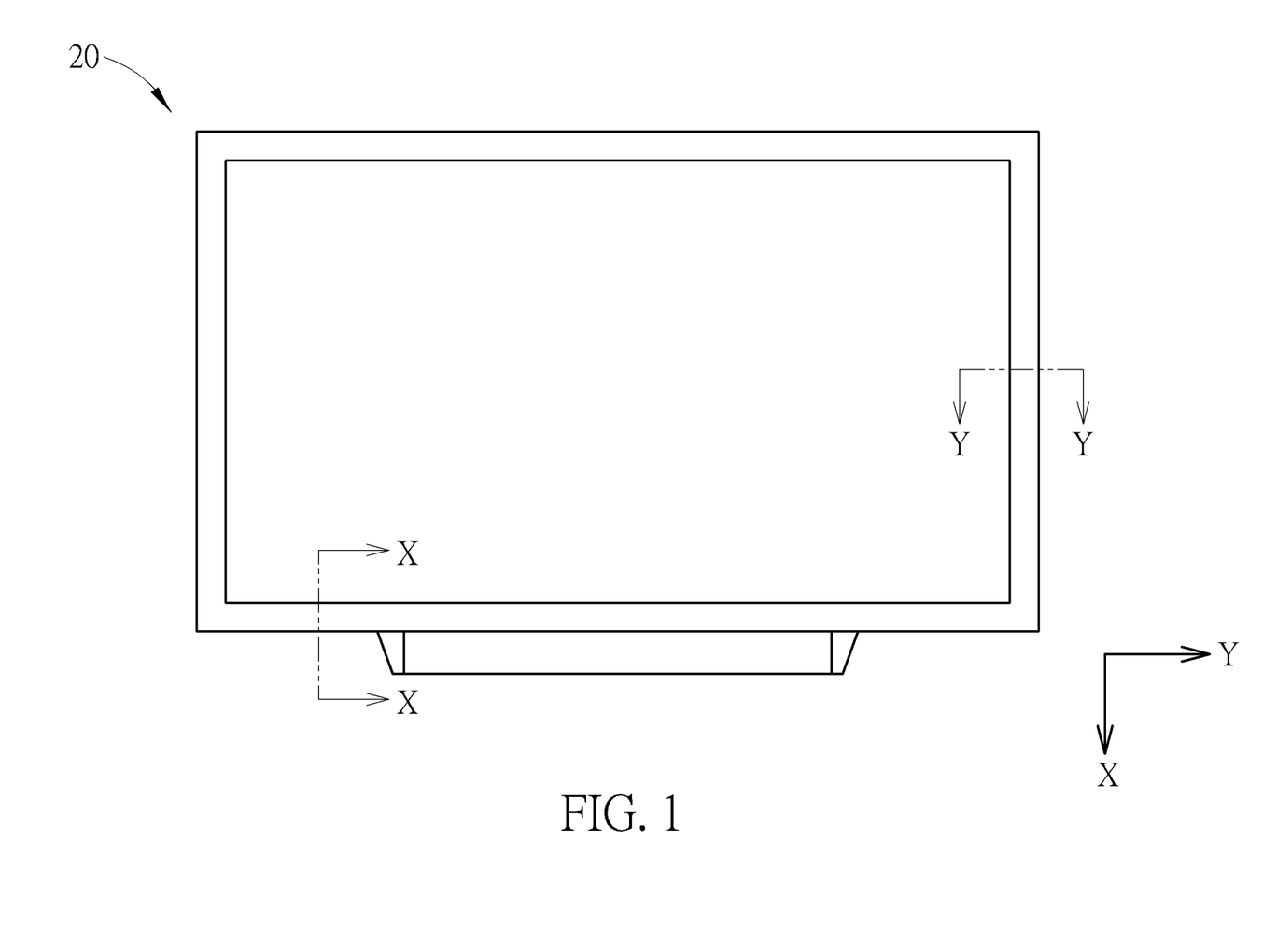
FIG. 1 is a schematic diagram showing a backlight module according to an embodiment of the invention.
Figure 2:
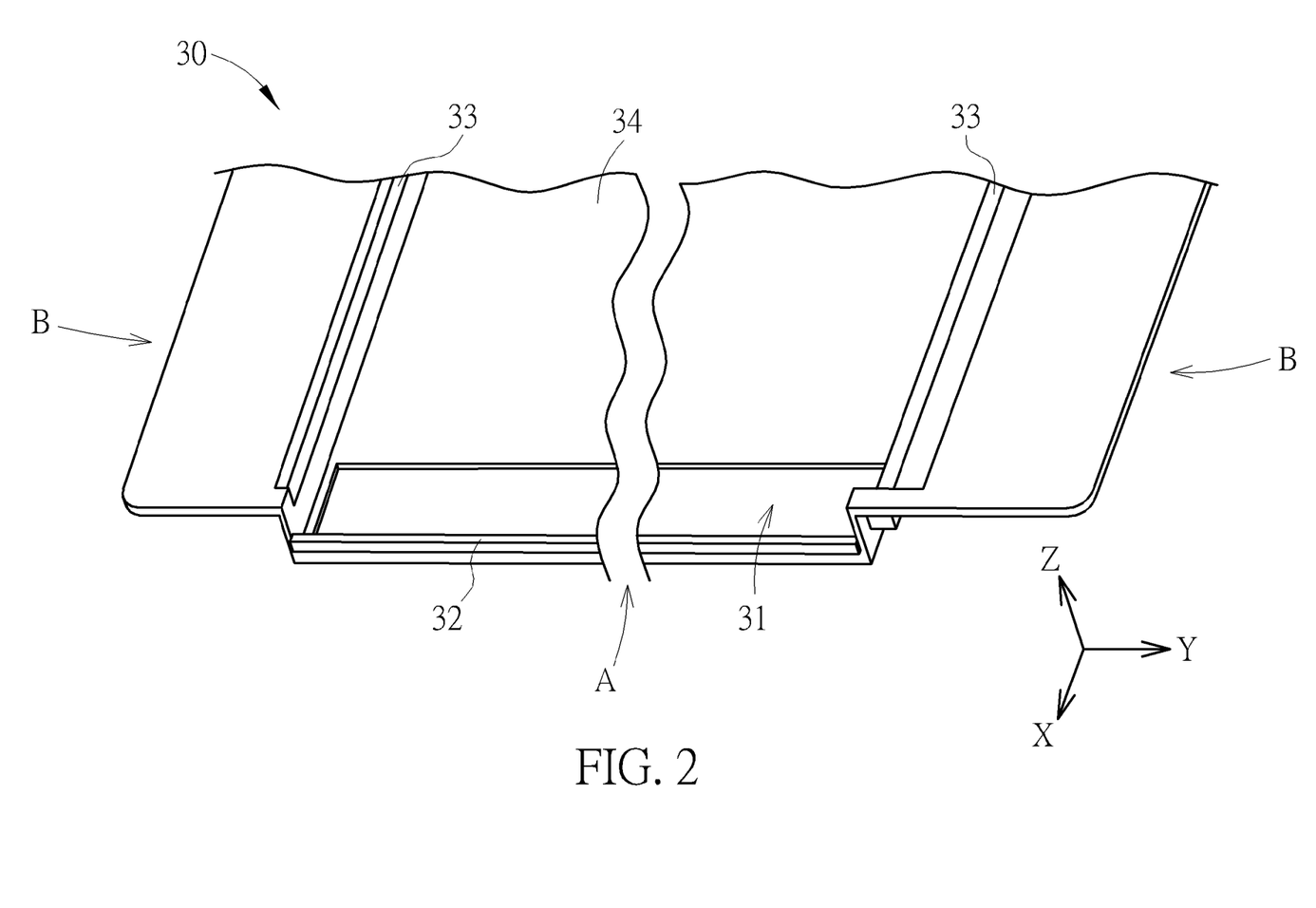
FIG. 2 is a schematic diagram of a reflective back cover of the backlight module.

Please refer to FIG. 1, which is a schematic diagram showing a backlight module according to an embodiment of the invention. For the following figures, descriptions have been made by illustrating the backlight module 20 in cross-section diagrams along X-X cutting line or Y-Y cutting line in FIG. 1. Please refer to FIG. 2, which is a schematic diagram of a reflective back cover 30 of the backlight module 20. The integral reflective back cover 30 may be monolithically made of plastic material, for example, the polyethylene Terephthalate (PET) having micro cellular structures by compression molding and cutting so as to have a monolithical structure with various thicknesses indifferent regions. The white material of the reflective back cover 30 is by itself light-reflective that can reflect lights emitted from a light component and a light guide plate. As the reflective back cover 30 gets thicker, the better effect when reflecting lights. Hence, in the embodiment of the invention, the reflective back cover 30 of the backlight module 20 has the function of a reflector, and also serves to function as a back metal cover and a positioning plastic frame when properly processed. In FIG. 2, the reflective back cover 30 includes a concave 31 at a light source side A of an assembling surface 34, which is used for containing, retaining, and positioning alight component of the backlight module 20. The reflective back cover 30 also includes a plurality of supportive sections 33 at a non-light-source side B for supporting other components of the backlight module 20 and the overall display.

Figure 3:
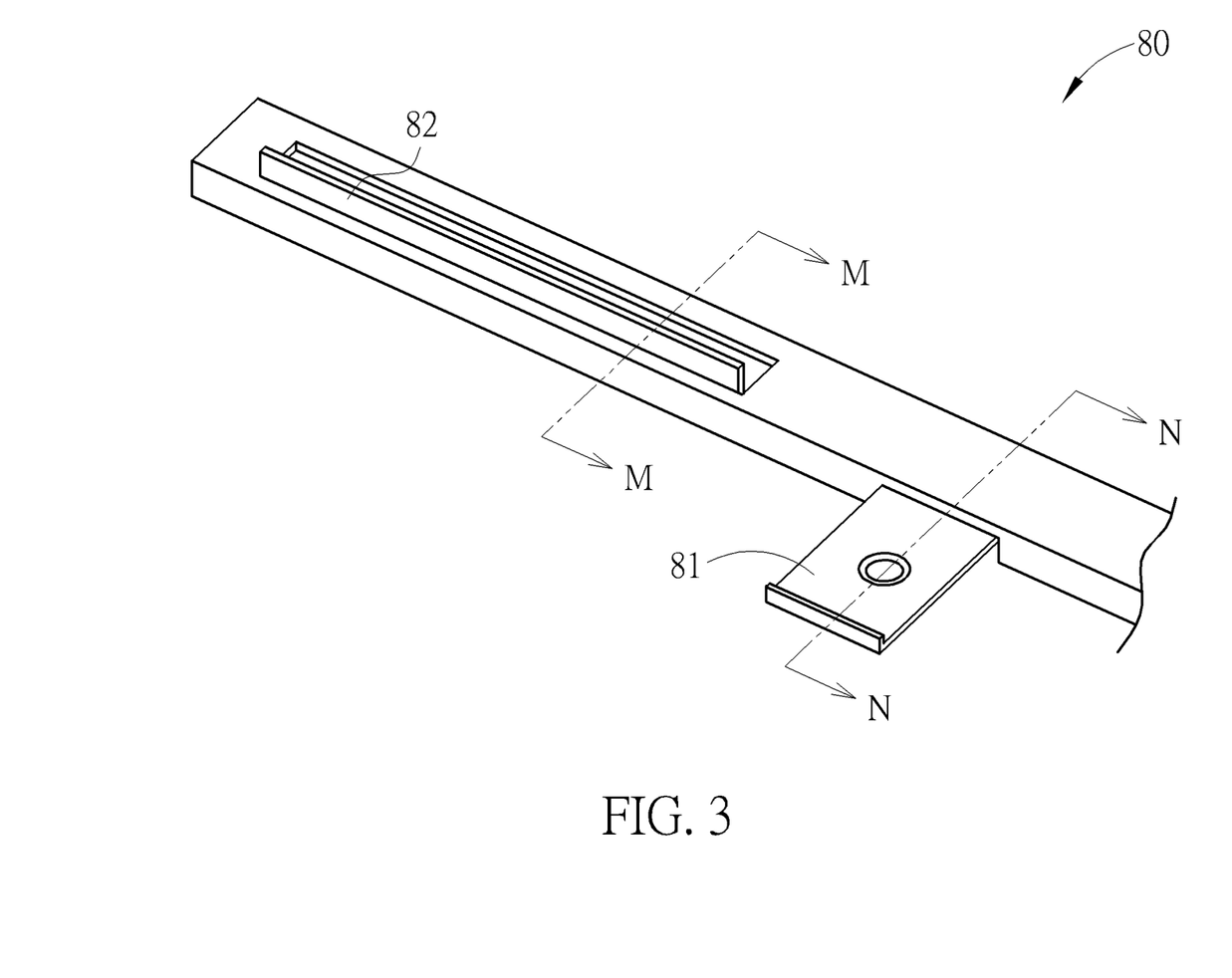
FIG. 3 is a schematic diagram of a metal frame of the backlight module.

Please refer to FIG. 3, which is a schematic diagram of a metal frame 80 of the backlight module 20. The metal frame 80, which may also be a plastic frame or a wrapping tape in other embodiments, is configured at the light source side A of the backlight module 20, with an extended fastening part 81 utilized for fastening a control circuit of the light component. A straight blocker 82 can position and abut against a panel module of the display.

Figure 4:
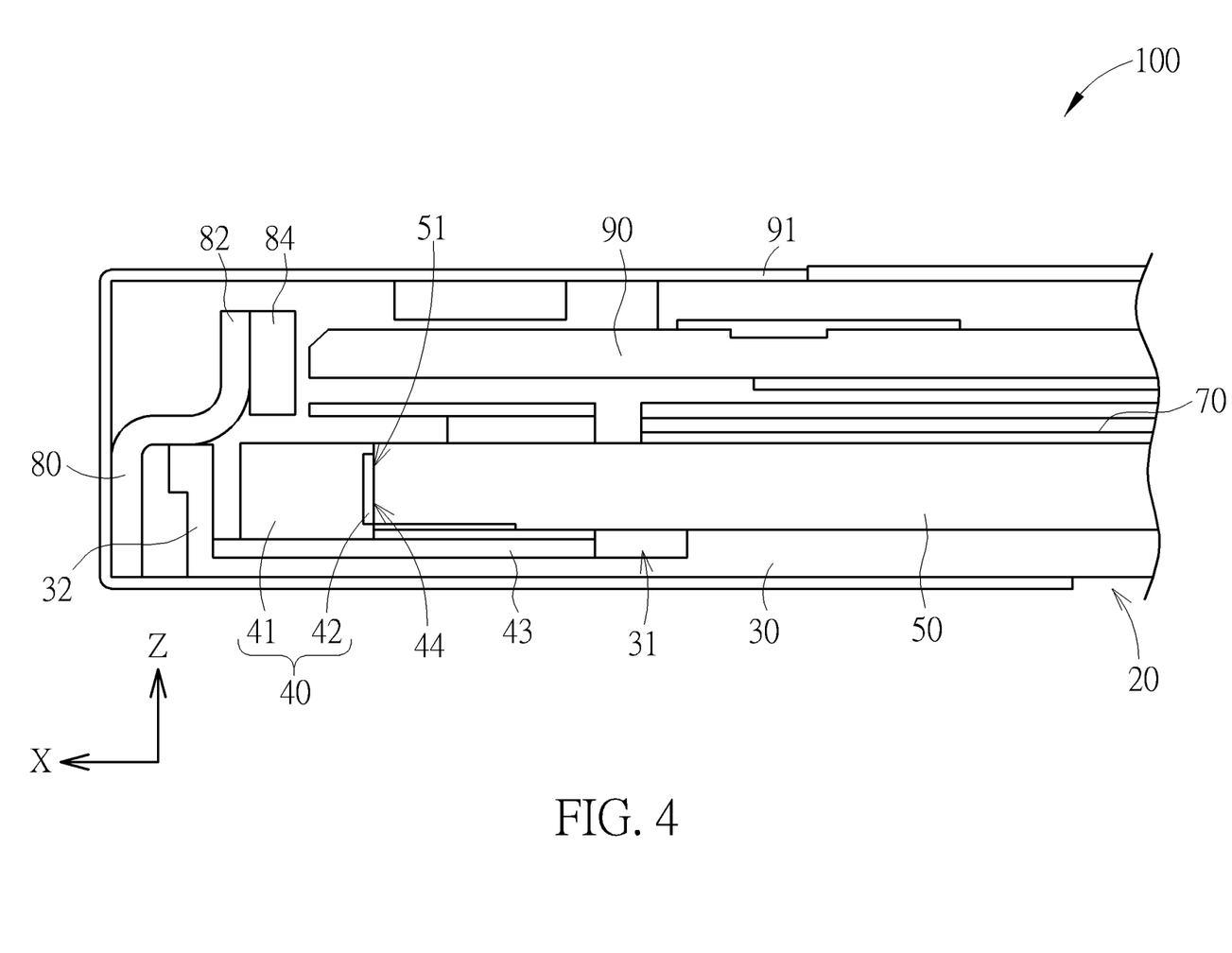
FIG. 4 is a schematic diagram showing a cross-sectional view of a display having a first embodiment of the backlight module along the M-M cutting line in FIG. 3.
Figure 5:
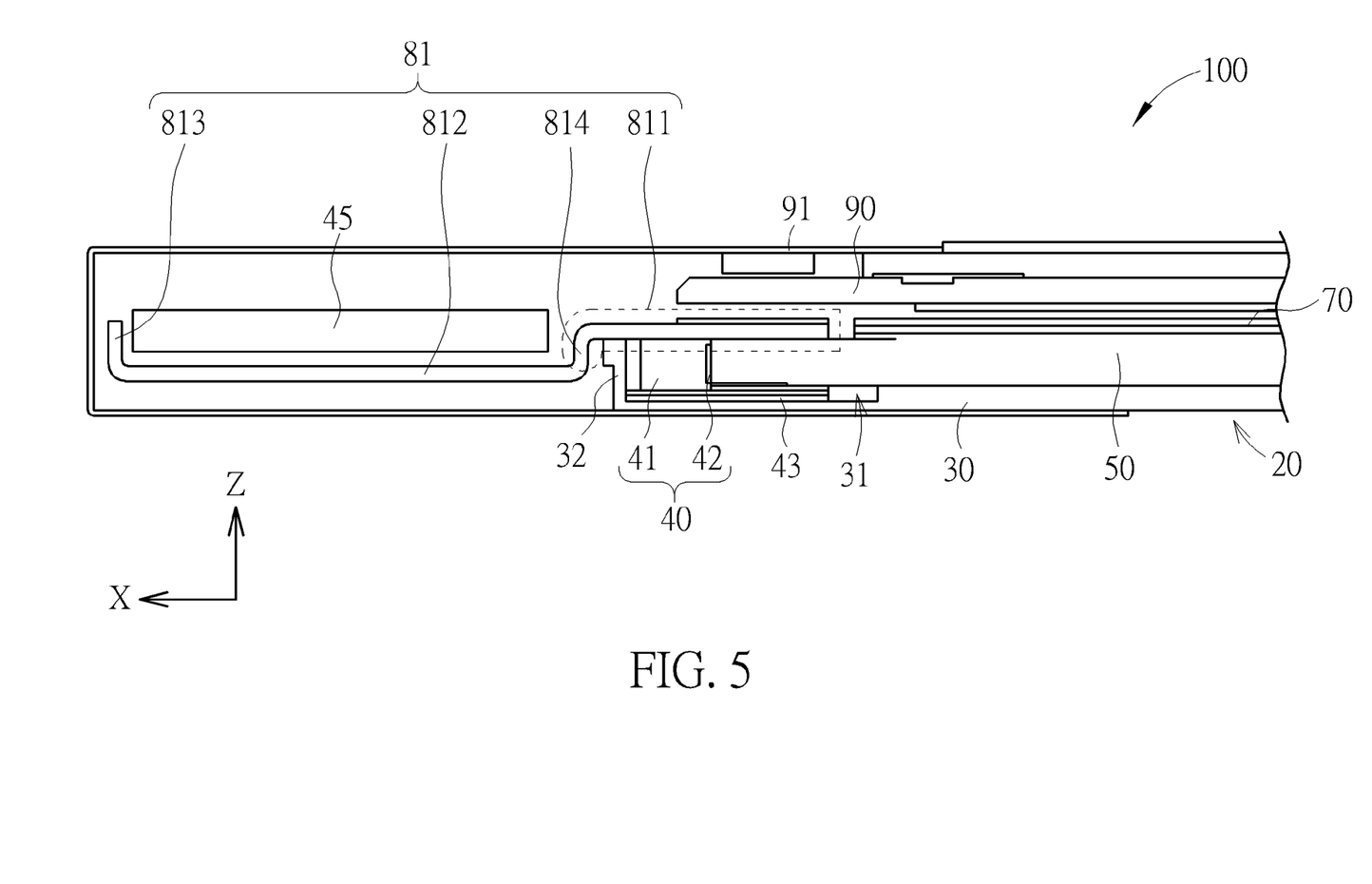
FIG. 5 is a schematic diagram showing a cross-sectional view of a display having a first embodiment of the backlight module along the N-N cutting line in FIG. 3.

Please refer to FIG. 4 and FIG. 5. FIG. 4 is a schematic diagram showing a cross-sectional view of a display device 100 having a first embodiment of the backlight module 20 along the X-X cutting line, the light source side in FIG. 1 and along the M-M cutting line in FIG. 3. FIG. 5 is a schematic diagram showing a cross-sectional view of the display device 100 along the N-N cutting line in FIG. 3. The display device 100 includes the backlight module 20 and a panel module 90 and wrapped with a wrapper 91. The backlight module 20 includes a light component 40, a light guide plate 50, the integral reflective back cover 30, and a plurality of optical films 70, which stack on the light guide plate 50. The light component 40 is preferably light emitting diode and includes a housing 41 and a chip 42, which are connected to a circuit board 45 via a circuit board 43, wherein the circuit board 45 may be a hard printed circuit board 45, and the circuit board 43 may be a flexible printed circuit board, printed circuit board (PCB), or a carrier where the chip 42 may be mounted directly. In the embodiments illustrated and described herein, the circuit board 43 is represented as a flexible printed circuit board for descriptive purpose.

As mentioned before, the circuit board 45 controls the light component 40 and is fastened by the extended fastening part 81. More particularly, the frame 80 can be recognized as several parts. A first section 811 of the frame 80 is mounted on the side of the reflective back cover 30 and has a vertical part 814 perpendicular to a direction x, a second section 812 of the frame 80 is connected with one end to the vertical part 814 of the first section 811 and the second section 812 extends parallel with the assembling surface 34, and a third section 813 is extending parallel with the vertical part 814 and connected to the other end of the second section 812. The vertical part 814, the second section 812, and the third section 813 form a U-shaped holding part and the circuit board 45 is located in the U-shaped holding part.

The light component 40 generates alight source where the chip 42 has a light emitting surface 44 at a side, while the light guide plate 50 has an incident surface 51. The light guide plate 50 uses the incident surface 51 to abut against the light emitting surface 44 of the chip 42 along the direction x to receive the light source generated by the light component 40 and evenly guide the lights to the whole plane of the light guide plate 50. The light component 40 and the light guide plate 50 are assembled to the assembling surface 34 of the reflective back cover 30. The concave 31 contains the light component 40 and the flexible printed circuit board 43 when the light component 40 and the flexible printed circuit board 43 are mounted to the concave 31 downwards along a direction z. In this embodiment, the flexible printed circuit board 43 and the light component 40 are contained in the concave 31 and are retained by the concave 31 from moving along the direction x. As a result, as the light guide plate 50 abuts against the light component 40 along the direction x, the concave 31 of the reflective back cover 30 is capable of retaining and positioning the light component 40, ensuring close abutting relation between the light guide plate 50 and the light component 40 during assembly. Please be noted that, in the first embodiment, the light component 40 and the flexible printed circuit board 43 are assembled to the reflective back cover 30 vertically downwards and retained horizontally by the concave 31. The reflective back cover 30 further includes a side plate 32 extending along the direction z and configured near a side of the concave 31 opposite to the light guide plate 50. The side plate 32 is located near and has a gap to the light component 40. As a part of the reflective back cover 30, the side plate 32 is also light reflective for reflecting the lights toward the light guide plate 50.

Additionally, in the cross-sectional view of FIG. 4, the blocker 82 of the metal frame 80 further includes a cushion 84 utilized for absorbing shock from the panel module 90 as the panel module 90 is mounted on the backlight module 20. Further referring to FIG. 4 and FIG. 5, the metal frame 80 roughly covers around the light component 40, its metal material further used for EMS protection.

Figure 6:
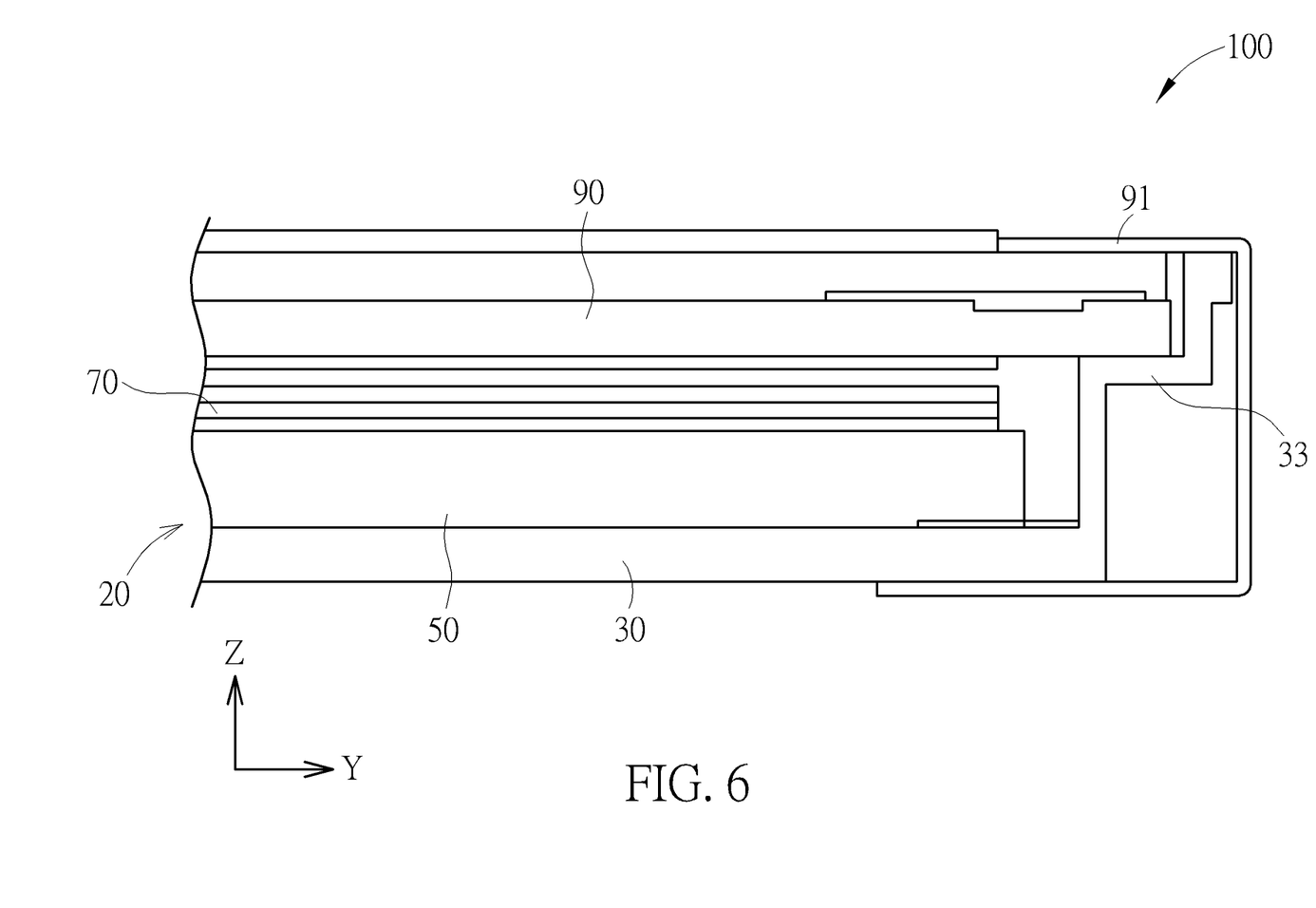
FIG. 6 is a partial cross-sectional view of a non-light-source side of the display.
Figure 7:
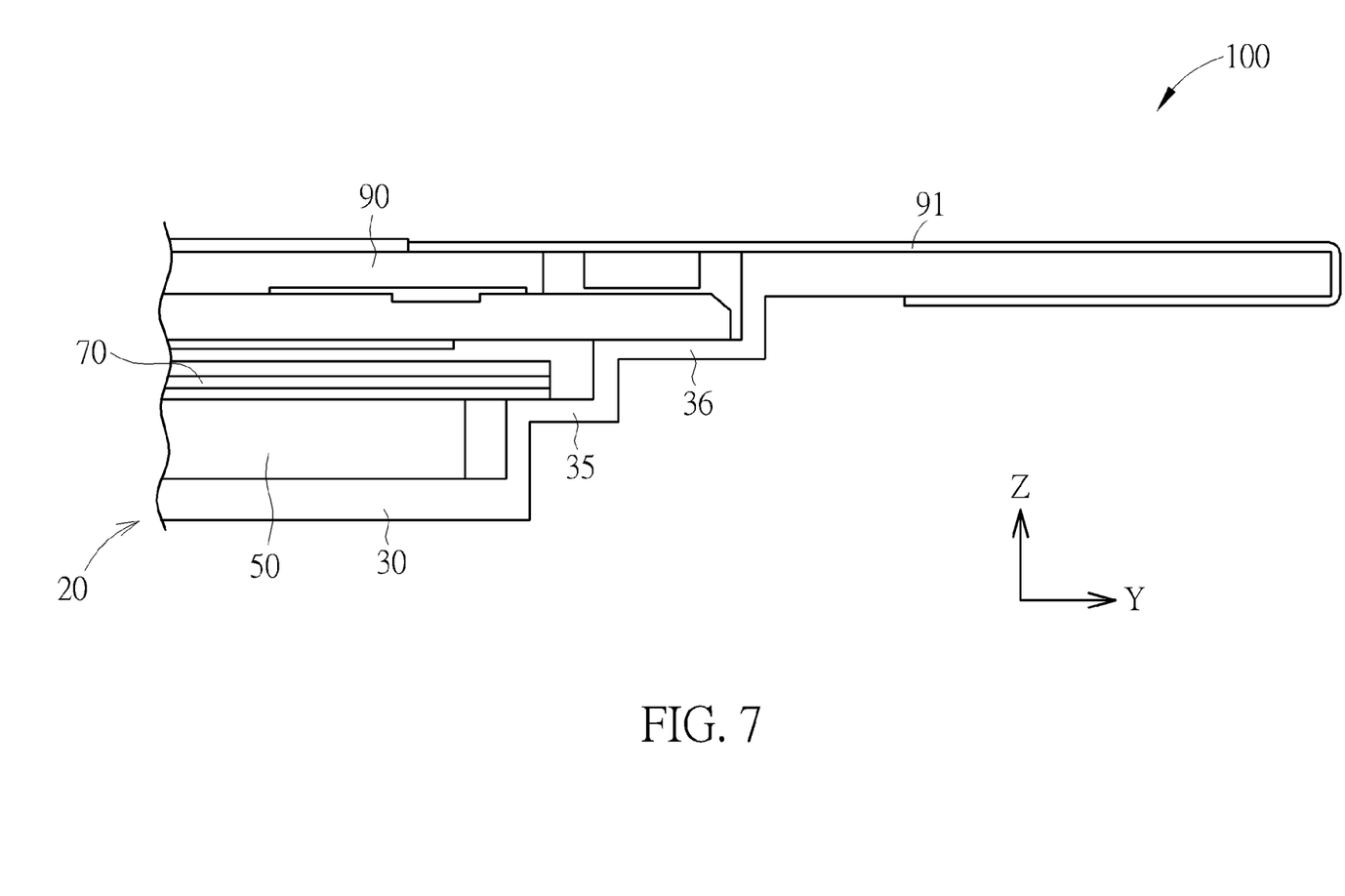
FIG. 7 is a partial cross-sectional view of another embodiment of a non-light-source side of the display.

Please refer to FIG. 6 and FIG. 7. FIG. 6 is a partial cross-sectional view of a non-light-source side B of the display device 100, and FIG. 7 shows another embodiment of the display device 100. As previously depicted, the reflective back cover 30 of the invention has the functions of a reflector for reflecting lights, a back metal cover for supporting purpose, and a plastic frame for positioning each component. In FIG. 6, the reflective back cover 30 has a supportive section 33 at the non-light-source side B. After the light component 40, the light guide plate 50, and the optical films 70 of the backlight module 20 are assembled to the reflective back cover 30, the panel module 90 can be assembled to the supportive section 33 of the reflective back cover 30. A necessary distance is provided between the panel module 90 and the optical films 70 of the backlight module 20. In another embodiment as shown in FIG. 7, the reflective back cover 30 includes a first supportive section 35 and a second supportive section 36 at the non-light-source side B, where the first supportive section 35 is utilized for supporting and positioning the optical films 70 and the second supportive section 36 is utilized for supporting and positioning the panel module 90 to provide predetermined gaps between components.

Figure 8:
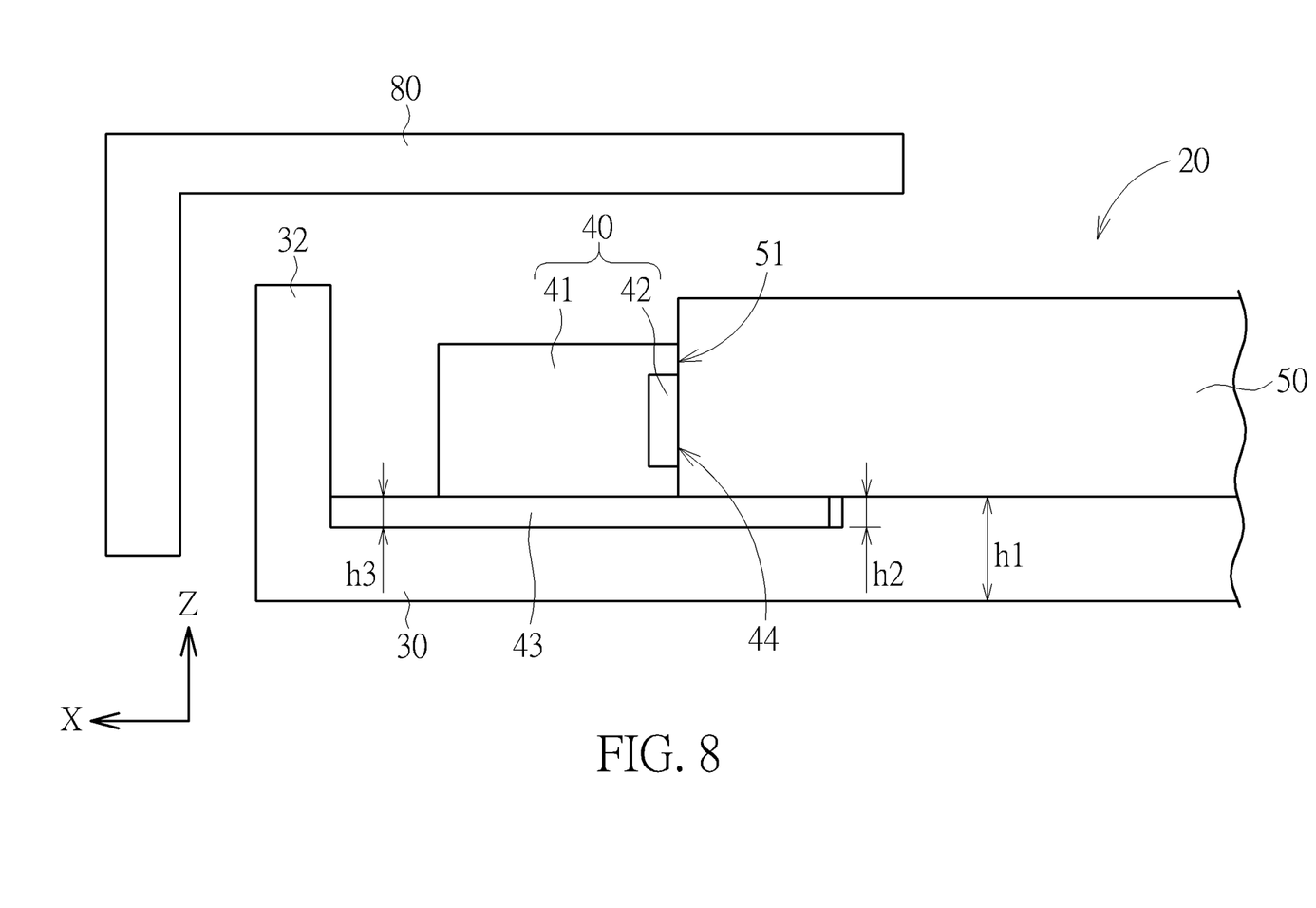
FIG. 8 is a partial cross-sectional view of a portion of components of a first embodiment of the backlight module.
Figure 9:
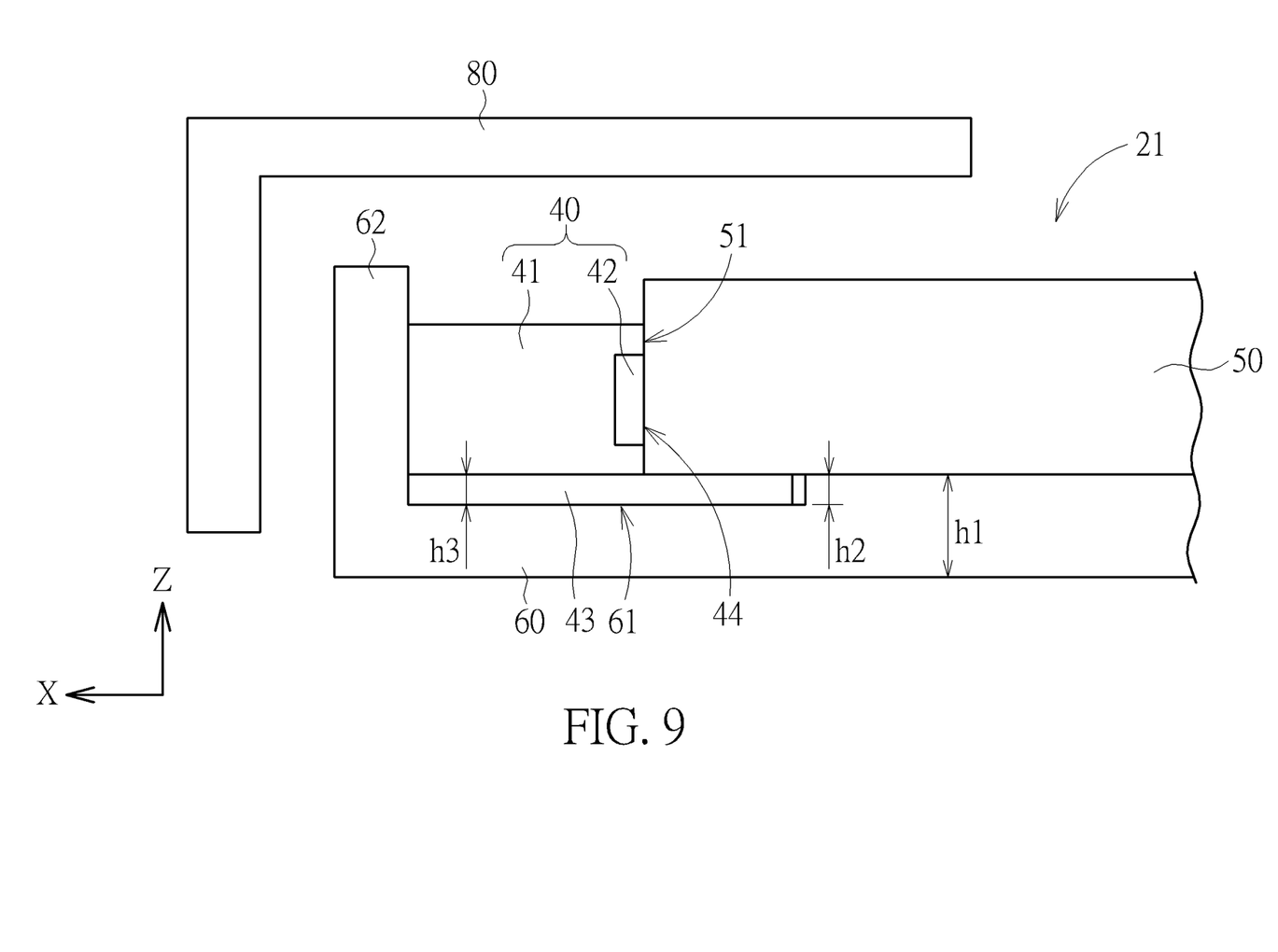
FIG. 9 is a partial cross-sectional view of a portion of components of a second embodiment of the backlight module.
Figure 10:
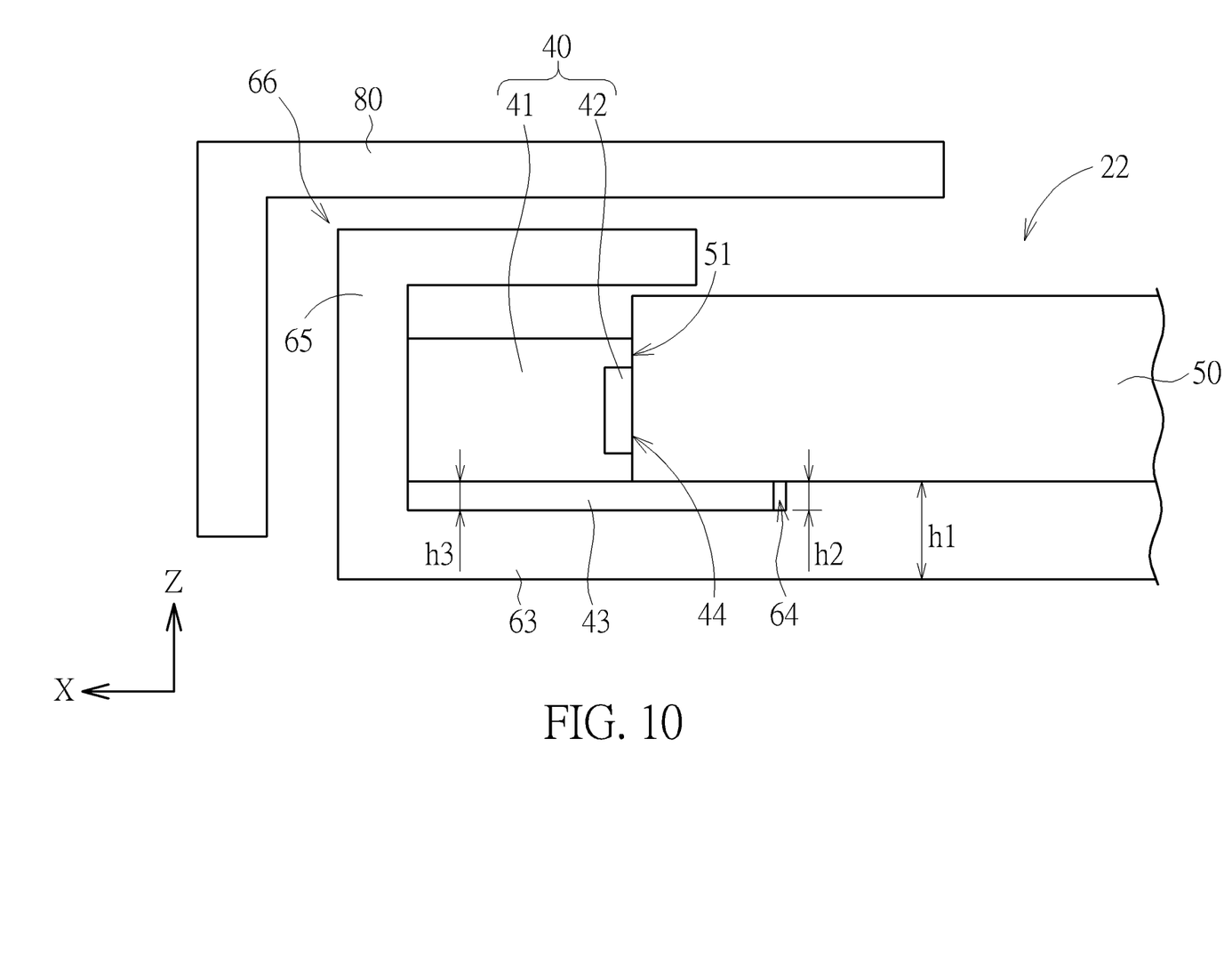
FIG. 10 is a partial cross-sectional view of a portion of components of a third embodiment of the backlight module.

Please refer to FIG. 8, which is a partial cross-sectional view of a portion of components of a first embodiment of the aforesaid backlight module 20. In particular, for the first embodiment, the thickness $h_1$ of the reflective back cover 60 falls preferably within 0.4 mm-1.0 mm, while the depth $h_2$ of the concave 31 falls preferably within 0.2 mm-0.5 mm, and the thickness $h_3$ of the flexible printed circuit board 43 contained inside the concave 31 is preferably smaller than the depth $h_2$ of the concave 31. In such way, the light component 40 above the flexible printed circuit board 43 is slightly sinked into the concave 31 when mounted therein, ensuring the lights emitted by the chip 42 of the light component 40 from the light emitting surface 44 to completely injecting into the incident surface 51 of the light guide plate 50. Besides the embodiment showing in FIG. 8, in a second embodiment in FIG. 9, the side plate 62 of the reflective back cover 60 is adjacent to the light component 40 when the light component 40 and the flexible printed circuit board 43 are contained in the concave 61. In a third embodiment showing in FIG. 10, the side plate 65 of the reflective back cover 63 is also adjacent to the light component 40 and further extends laterally rightwards when the light component 40 and the flexible printed circuit board 43 are contained in the concave 64. Such cap structure 66 of the reflective back cover 63 at a side near the concave 64 is capable of covering along the surfaces of the light component 40 except for the light emitting surface, providing better optical output.

Figure 11:
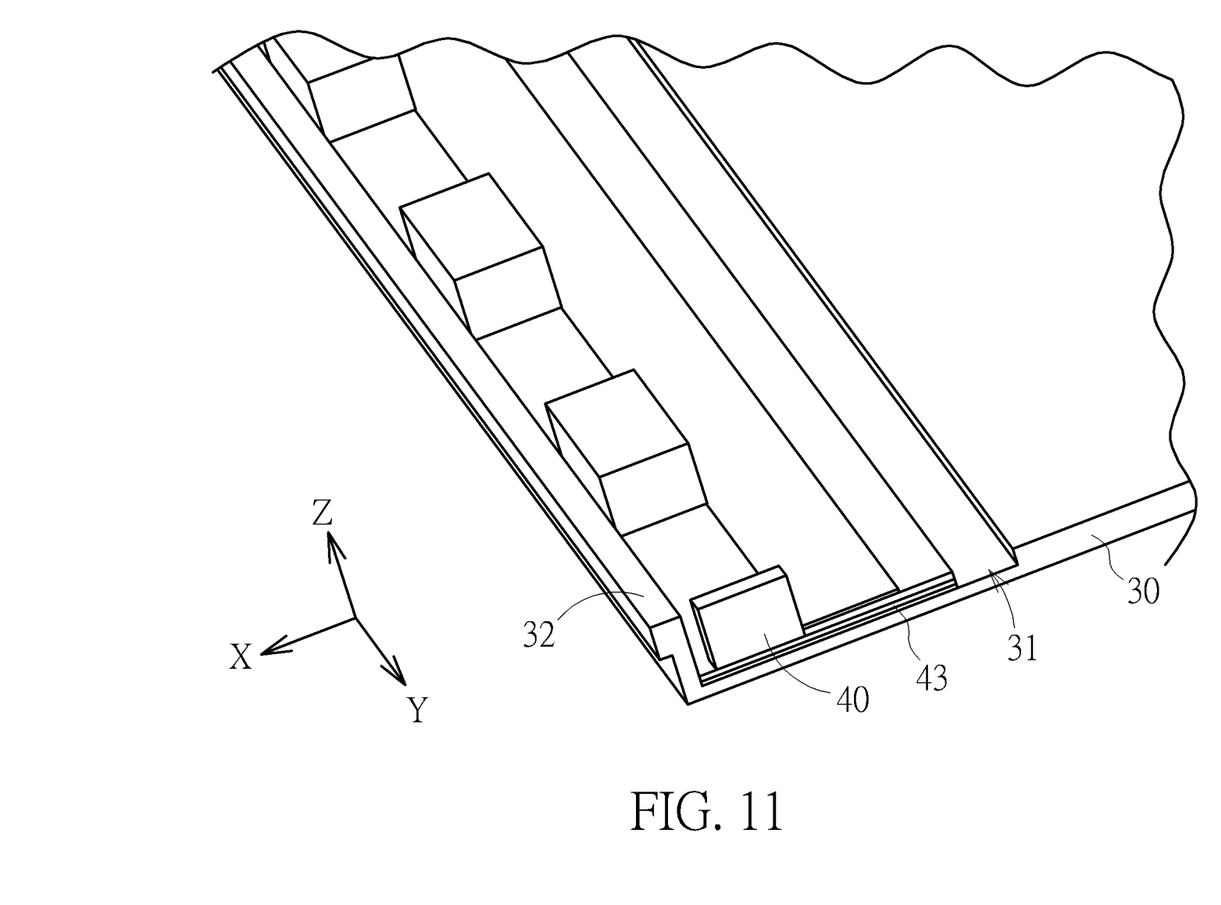
FIG. 11 is a schematic diagram of the reflective back cover assembled with the light component in the concave.
Figure 12:
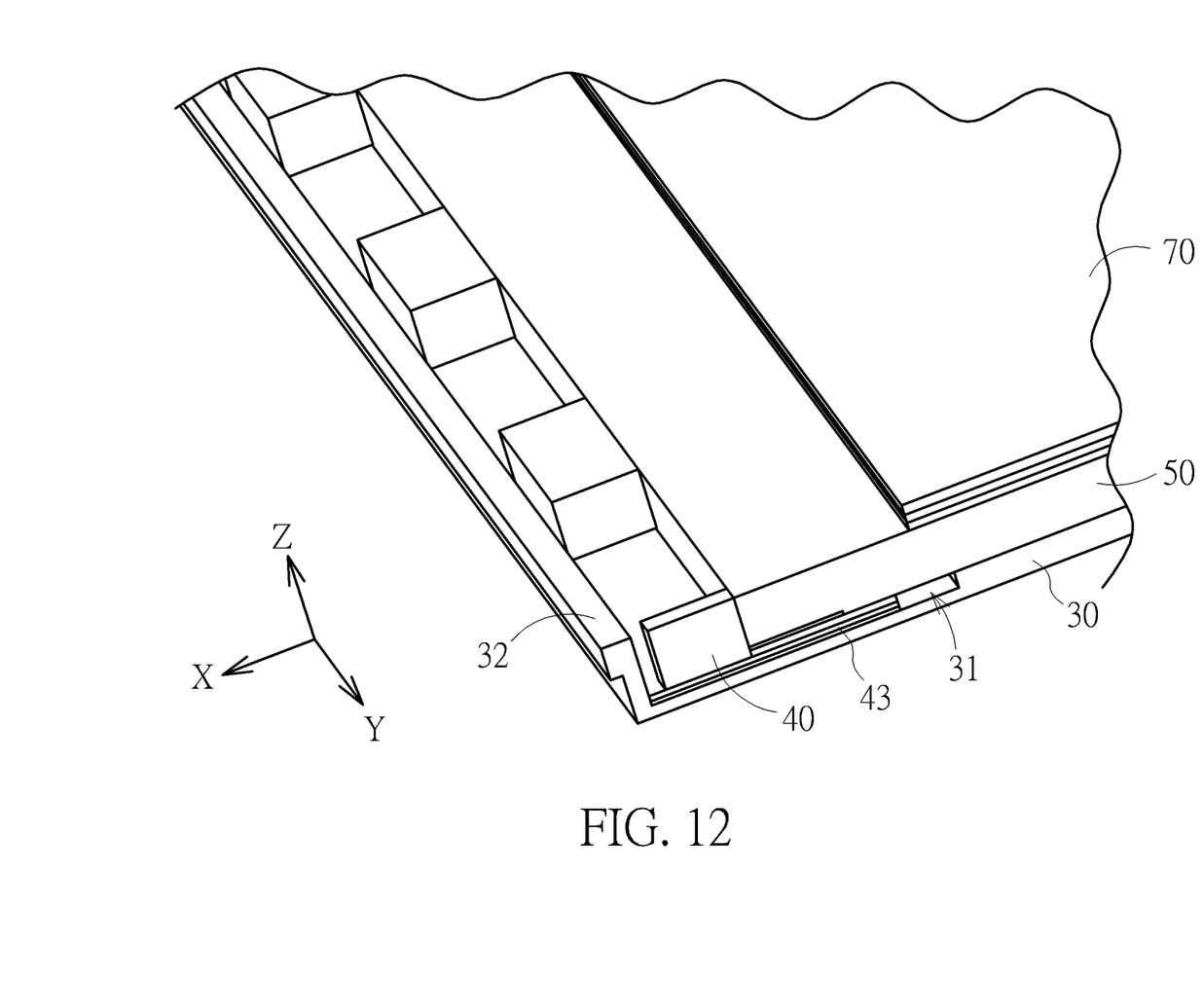
FIG. 12 is a schematic diagram of the reflective back cover further assembled with the light guide plate and the optical films.
Figure 13:
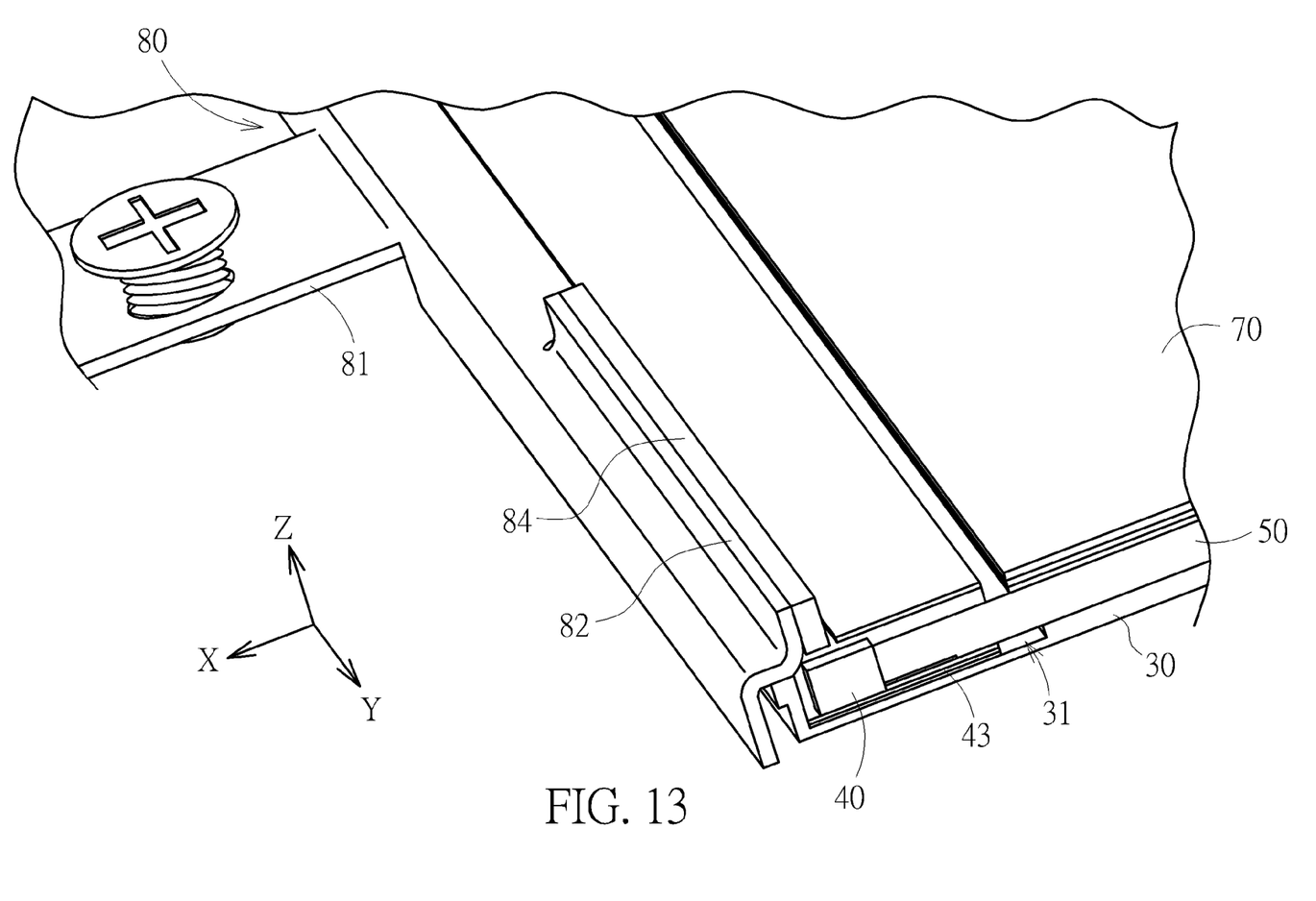
FIG. 13 is a schematic diagram of the components in FIG. 12 further assembled with the metal frame fastening the circuit board.
Figure 14:
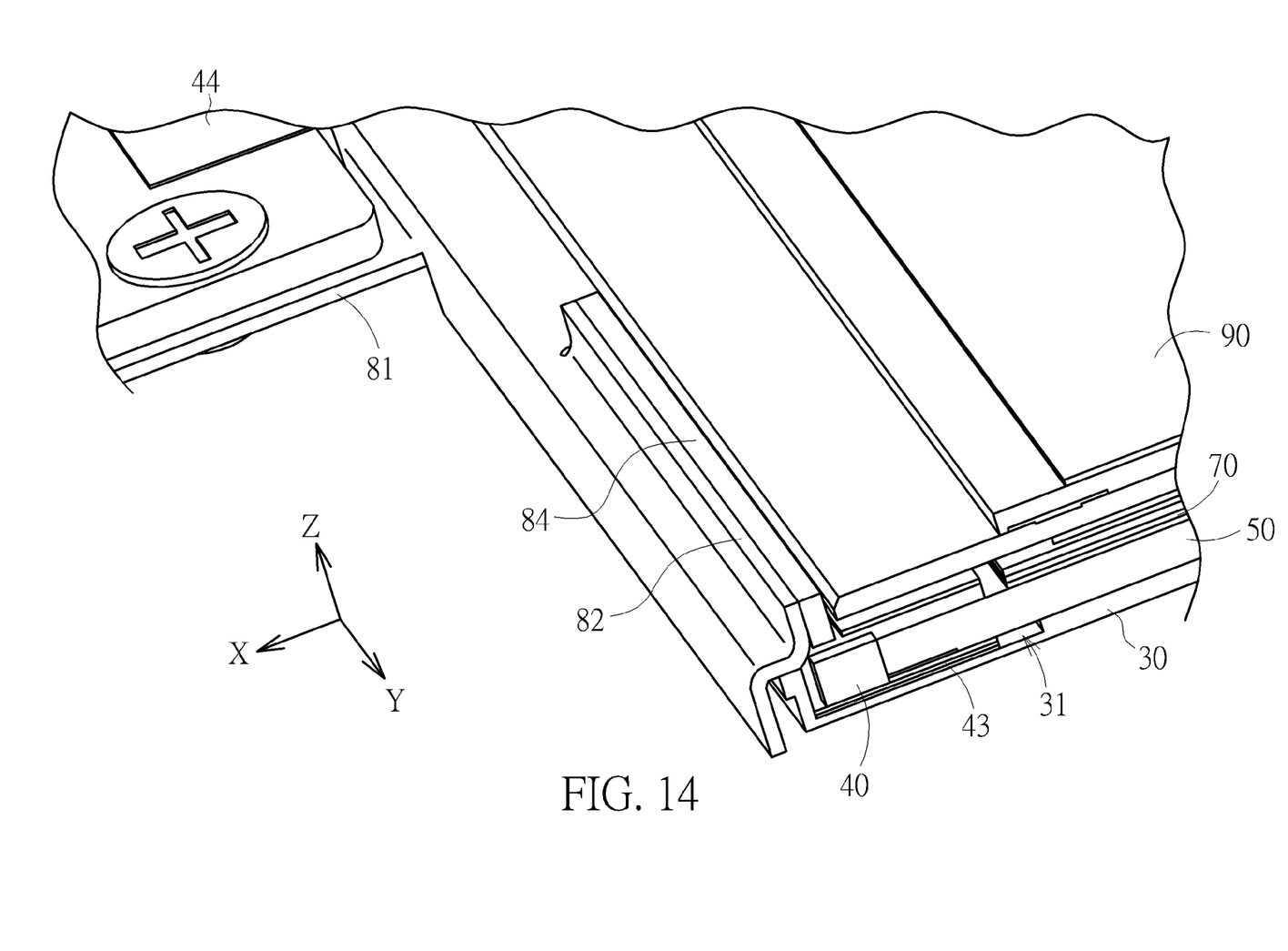
FIG. 14 is a schematic diagram of the components in FIG. 13 further assembled with the panel module.

Please refer to FIG. 11 to FIG. 14, which are schematic diagrams showing an assembly process of each component of the display device 100 having the first embodiment of backlight module 20. In FIG. 11, after the light component 40 and the flexible printed circuit board 43 are assembled to the concave 31 of the reflective back cover 30 along the direction z, the concave 31 can position and retain the flexible printed circuit board 43 and the light component 40 from moving along the direction x. In FIG. 12, the light guide plate 50 is assembled along the direction x to the reflective back cover 30, while the light guide plate 50 is pushed along the direction x toward the light component 40, which is now effectively retained by the concave 31, such that the light emitting surface of the light component 40 can be tightly abutted against by the light incident surface of the light guide plate 50. The optical films 70 are assembled to the light guide plate 50 along the reverse of direction z. In FIG. 13, the metal frame 80 is assembled at the light source side of the reflective back cover 30 and finally in FIG. 14, the panel module 90 is assembled thereon. During the assembling process, each component can be supported and positioned by the aforesaid supportive sections 33, 35, 36 at the non-light-source side of the reflective back cover 30.

The invention provides a backlight module using the reflective back cover. The reflective back cover is made of polyethylene Terephthalate having micro cellular structures and is processed by compression molding and cutting so as to have a monolithical structure with various thicknesses in different regions. The white material of the reflective back cover reflects lights such that the back cover can be an integral component featuring multiple functions of various components. With the thickness control of the reflective back cover, the concave can be formed at the side of the back cover where the light component is contained and the concave further retains the light component and its flexible printed circuit board. With the incorporation of the reflective back cover, the thickness of the backlight module can be reduced and a reliable and repetitive manufacturing of the backlight module can be introduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A backlight module, comprising:
a light component for generating light, the light component connected to and mounted on a first circuit board and comprising a light emitting surface;
a light guide plate comprising an incident surface for abutting against the light emitting surface of the light component along a first direction to receive the light;
a reflective back cover, for reflecting the light emitted from the light component and the light guide plate and comprising an assembling surface where the light component, the first circuit board, and the light guide plate are assembled; and
a frame configured at a side of the reflective back cover where the light component is assembled, wherein the frame extends parallelly with the assembling surface and away from the light component to form a fastening part outside the reflective back cover for holding a second circuit board of the light component, the frame comprising:
a first section mounted on the side of the reflective back cover and having a vertical part perpendicular to the first direction;
a second section, with one end connected to the vertical part of the first section, the second section extending parallel with the assembling surface; and
a third section parallel with the vertical part, the other end of the second section connected to the third section;
wherein the vertical part, the second section, and the third section are configured to hold the second circuit board.

2. The backlight module of claim 1, wherein the fastening part covers around the light component.

3. The backlight module of claim 1, wherein the fastening part is inflexible.

4. The backlight module of claim 1, wherein the reflective back cover comprises a cap structure at a side of the assembling surface, the cap structure formed into a U-shape and covering along surfaces of the light component except for the light emitting surface.

5. The backlight module of claim 1, wherein the reflective back cover is monolithically made of plastic material having micro cellular structures.

6. The backlight module of claim 1, wherein the light component is a light emitting diode.

7. The backlight module of claim 1, wherein the reflective back cover comprises a side plate configured near a side of the assembling surface, the side plate extending along a second direction and abutting against the light component when the light component is configured at the assembling surface along the second direction.

8. The backlight module of claim 1, wherein the first circuit board is a flexible printed circuit board or printed circuit board (PCB).

9. The backlight module of claim 1, wherein the frame further comprises a blocker protruding from the first section for positioning and abutting against a panel module and a cushion is attached to the blocker and facing the panel module when the panel module is mounted on the backlight module.

10. The backlight module of claim 9, wherein the blocker extends substantially vertically with the assembling surface.

11. The backlight module of claim 1, wherein the vertical part, the second section, and the third section form a U-shaped holding part, and the second circuit board is located in the U-shaped holding part.

12. A display device, comprising:
   a backlight module, comprising:
      a light component for generating light, the light component connected to and mounted on a first circuit board and comprising a light emitting surface;
      a light guide plate comprising an incident surface for abutting against the light emitting surface of the light component along a first direction to receive the light; and
      a reflective back cover, for reflecting the light emitted from the light component and the light guide plate, the reflective back cover comprising:
         an assembling surface where the light component, the first circuit board, and the light guide plate are assembled; and
         a side plate configured near a side of the assembling surface and extending along a second direction and abutting against the light component when the light component is configured at the assembling surface along the second direction;
      an optical film assembled, in the second direction, to the light guide plate;
      a frame configured at a side of the reflective back cover where the light component is assembled, the frame covering around the light component and comprising:
         a first section mounted on the side of the reflective back cover and having a vertical part perpendicular to the first direction;
         a second section, with one end connected to the vertical part of the first section, the second section extending parallel with the assembling surface; and
         a third section parallel with the vertical part, the other end of the second section connected to the third section; and
      a panel module assembled on the reflective back cover.

13. The display device of claim 12, wherein the frame extends parallelly with the assembling surface and away from the light component and the vertical part, the second section, and the third section form an inflexible fastening part for holding a second circuit board of the light component.

14. The display device of claim 12, wherein the reflective back cover is monolithically made of plastic material having micro cellular structures.

15. The display device of claim 12, wherein the first direction is perpendicular to the second direction.

16. The display device of claim 12, wherein the frame further comprises a blocker protruding from the first section for positioning and abutting against the panel module and a cushion is attached to the blocker and facing the panel module when the panel module is assembled on the reflective back cover.

17. The display device of claim 16, wherein the blocker extends substantially vertically with the assembling surface.

18. The display device of claim 12, wherein the vertical part, the second section, and the third section form a U-shaped holding part, and the second circuit board is located in the U-shaped holding part.

* * * * *